(12) United States Patent
Stemmer et al.

(10) Patent No.: US 7,789,464 B2
(45) Date of Patent: Sep. 7, 2010

(54) FITTING FOR A VEHICLE SEAT

(75) Inventors: Jürgen Stemmer, Remscheid (DE);
Rainer Messerschmidt, Düsseldorf (DE); Tobias Ewald, Essen (DE); Grit Scholz, Remscheid (DE); Andreas Norbisrath, Wuppertal (DE); Artur Komainda, Remscheid (DE); Holger Finner, Hückeswagen (DE); Ulrich Lehmann, Alfter (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/004,700

(22) Filed: Dec. 21, 2007

(65) Prior Publication Data
US 2008/0136242 A1 Jun. 12, 2008

Related U.S. Application Data

(63) Continuation of application No. PCT/EP2006/005255, filed on Jun. 2, 2006.

(30) Foreign Application Priority Data
Jun. 22, 2005 (DE) .................. 10 2005 028 779

(51) Int. Cl.
 *B60N 2/22* (2006.01)
 *B60N 2/235* (2006.01)
 *B60N 2/02* (2006.01)
(52) U.S. Cl. ........................ 297/362; 475/162
(58) Field of Classification Search ............ 297/362, 297/361.1, 367, 374; 475/162
See application file for complete search history.

(56) References Cited

U.S. PATENT DOCUMENTS 1,874,215 A * 8/1932 Ackerman et al. ....... 192/223.3

(Continued)

FOREIGN PATENT DOCUMENTS

DE 31 29 672 C1 10/1982

(Continued)

OTHER PUBLICATIONS

U.S. Appl. No. 12/004,550, filed: Dec. 21, 2007; In re: Jürgen Stemmer et al., entitled Fitting for a Vehicle Seat.

(Continued)

*Primary Examiner*—David Dunn
*Assistant Examiner*—Tania Abraham
(74) *Attorney, Agent, or Firm*—Womble Carlyle Sandridge & Rice, PLLC

(57) ABSTRACT

The invention relates to a fitting (10) for a vehicle seat, more particularly for a motor vehicle seat, comprising a first fitting part (11), a second fitting part (12) that is in geared connection with the first fitting part (11), an eccentric (27*a*, 27*b*; 127; 327) that is rotatably mounted on the fitting parts (11, 12), for driving a rolling movement of the first fitting part (11) and the second fitting part (12), a driver (21) for driving the eccentric (27*a*, 27*b*; 127; 327) and a brake for locking the fitting (10) against torque introduced at the output side in the rest state, with at least one wrap-spring brake (44) being provided as the brake, and the brake being acted upon by the driver (21) and the eccentric (27*a*, 27*b*; 127; 327).

18 Claims, 6 Drawing Sheets

U.S. PATENT DOCUMENTS

| | | | | |
|---|---|---|---|---|
| 2,132,009 | A * | 10/1938 | Ball | 248/394 |
| 3,111,822 | A * | 11/1963 | Hansen | 464/40 |
| 4,529,159 | A * | 7/1985 | Terada et al. | 248/421 |
| 4,533,027 | A * | 8/1985 | Otani et al. | 192/223.4 |
| 4,614,257 | A * | 9/1986 | Harada et al. | 192/223.4 |
| 4,648,575 | A * | 3/1987 | Kawade | 248/371 |
| 4,903,931 | A * | 2/1990 | Shimazaki | 248/421 |
| 4,926,987 | A * | 5/1990 | Honma | 192/223.4 |
| 4,950,032 | A * | 8/1990 | Nagasaka | 297/284.7 |
| 5,277,672 | A | 1/1994 | Droulon et al. | |
| 5,308,294 | A | 5/1994 | Wittig et al. | |
| 5,553,922 | A * | 9/1996 | Yamada | 297/362 |
| 5,634,689 | A | 6/1997 | Putsch et al. | |
| 5,871,414 | A * | 2/1999 | Voss et al. | 475/175 |
| 6,305,748 | B1 | 10/2001 | Ohba | |
| 6,619,743 | B1 | 9/2003 | Scholz et al. | |
| 6,877,597 | B2 * | 4/2005 | Bach et al. | 192/223.4 |
| 6,918,635 | B2 | 7/2005 | Finner et al. | |
| 7,090,298 | B2 * | 8/2006 | Lange | 297/362 |
| 2004/0014545 | A1 | 1/2004 | Branov et al. | |
| 2004/0258101 | A1 | 12/2004 | Lange | |
| 2005/0099049 | A1 | 5/2005 | Spevy et al. | |
| 2005/0110322 | A1 | 5/2005 | Cha | |
| 2006/0068962 | A1 * | 3/2006 | Allsopp | 475/182 |

FOREIGN PATENT DOCUMENTS

| | | |
|---|---|---|
| DE | 44 36 101 A1 | 6/1995 |
| DE | 197 29 562 A1 | 1/1998 |
| DE | 20 2004 009 594 U1 | 9/2004 |
| DE | 103 52 630 A1 | 6/2005 |
| EP | 1 013 500 A2 | 6/2000 |

OTHER PUBLICATIONS

Notice of Allowability for U.S. Appl. No. 12/004,550, filed: Dec. 21, 2007; in re: Stemmer et al., entitled Fitting for a Vehicle Seat.

* cited by examiner

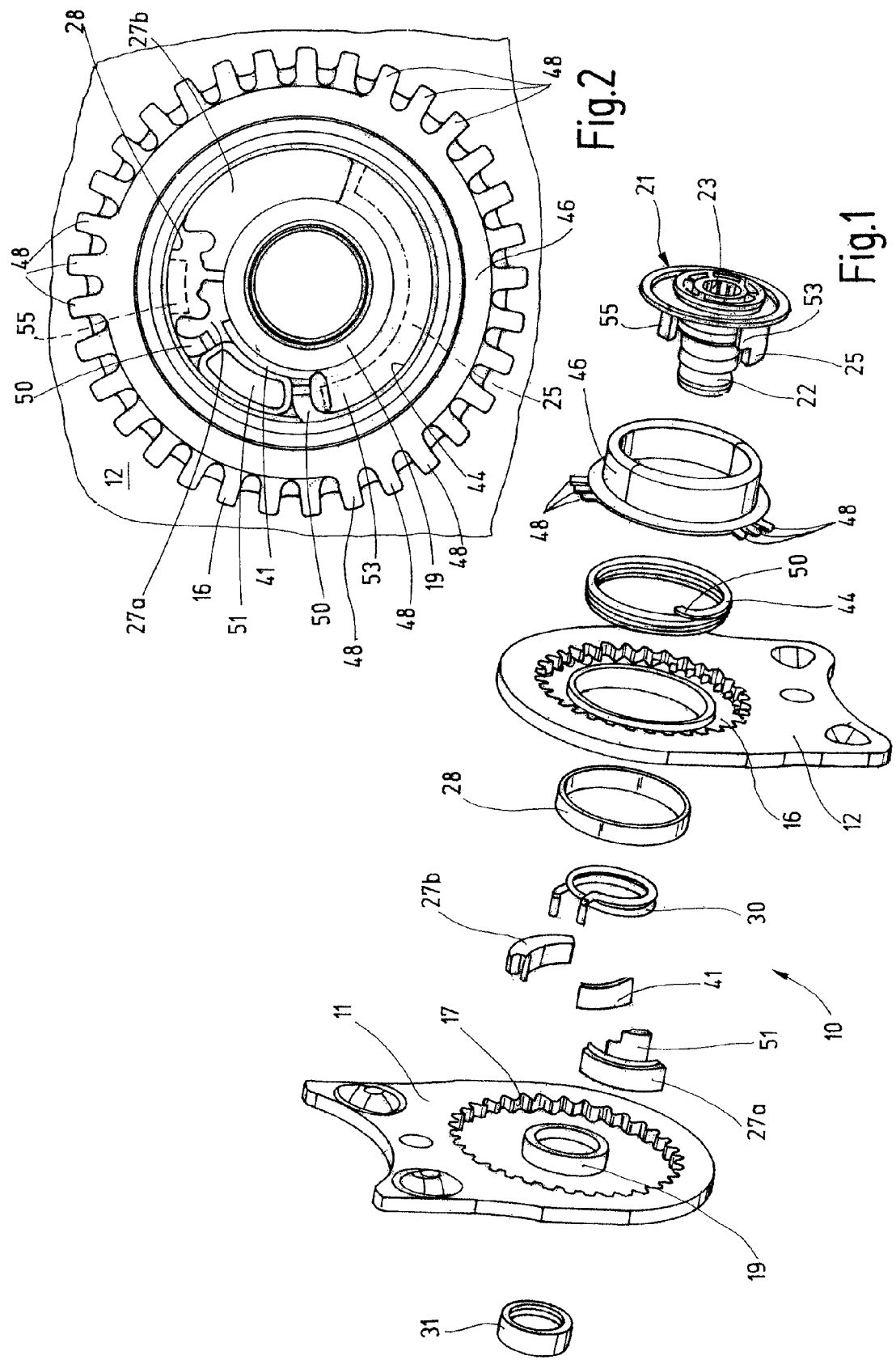

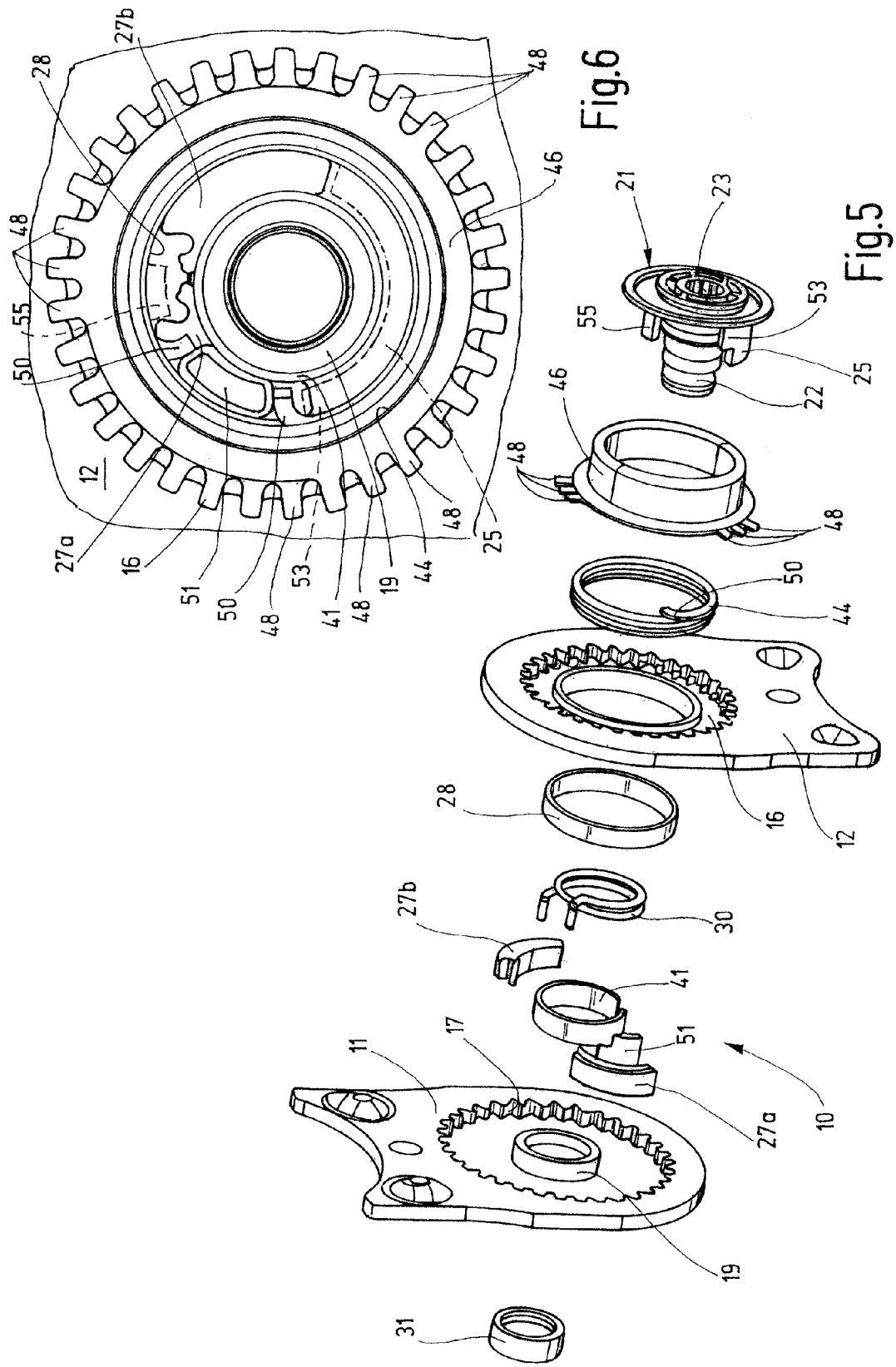

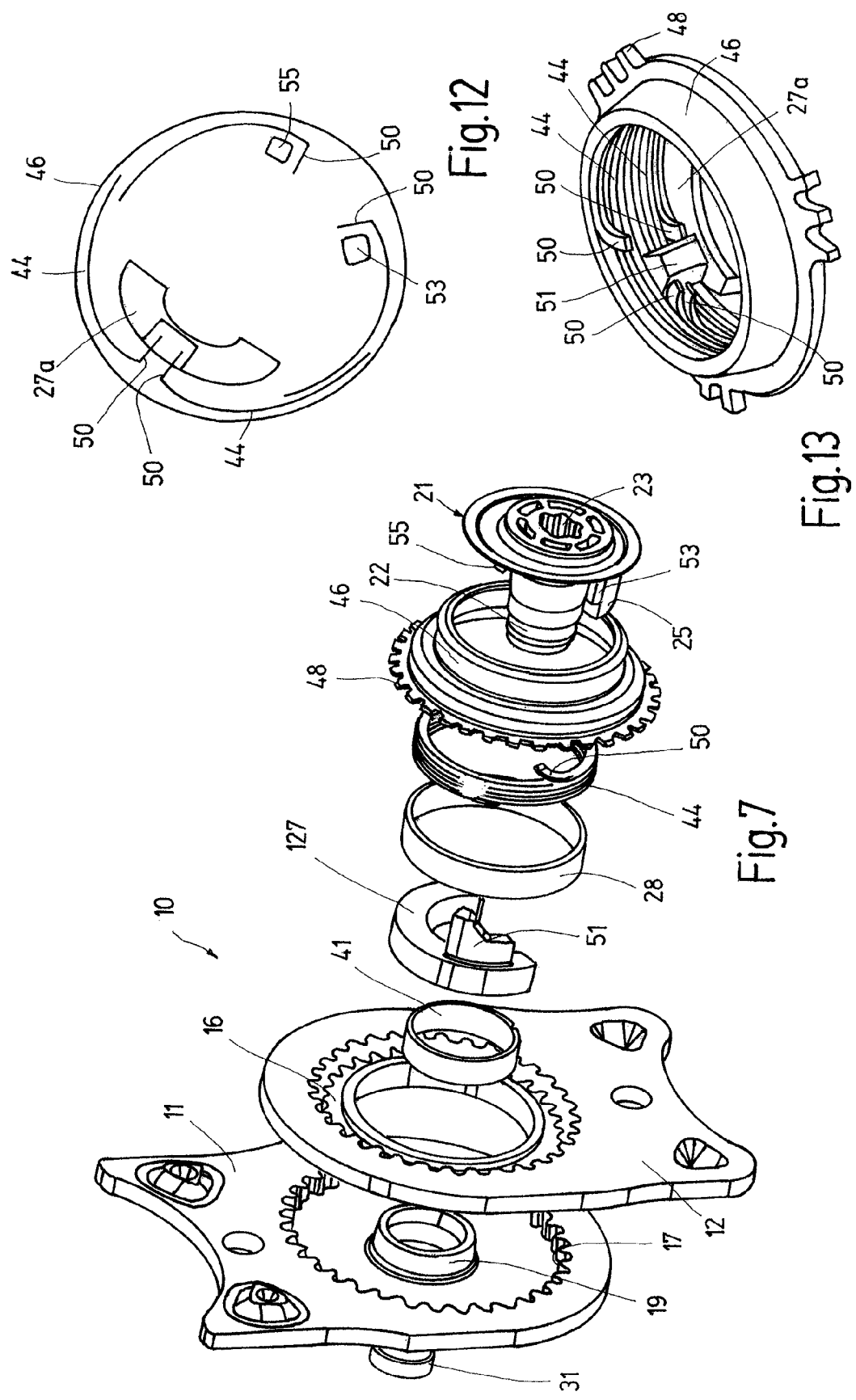

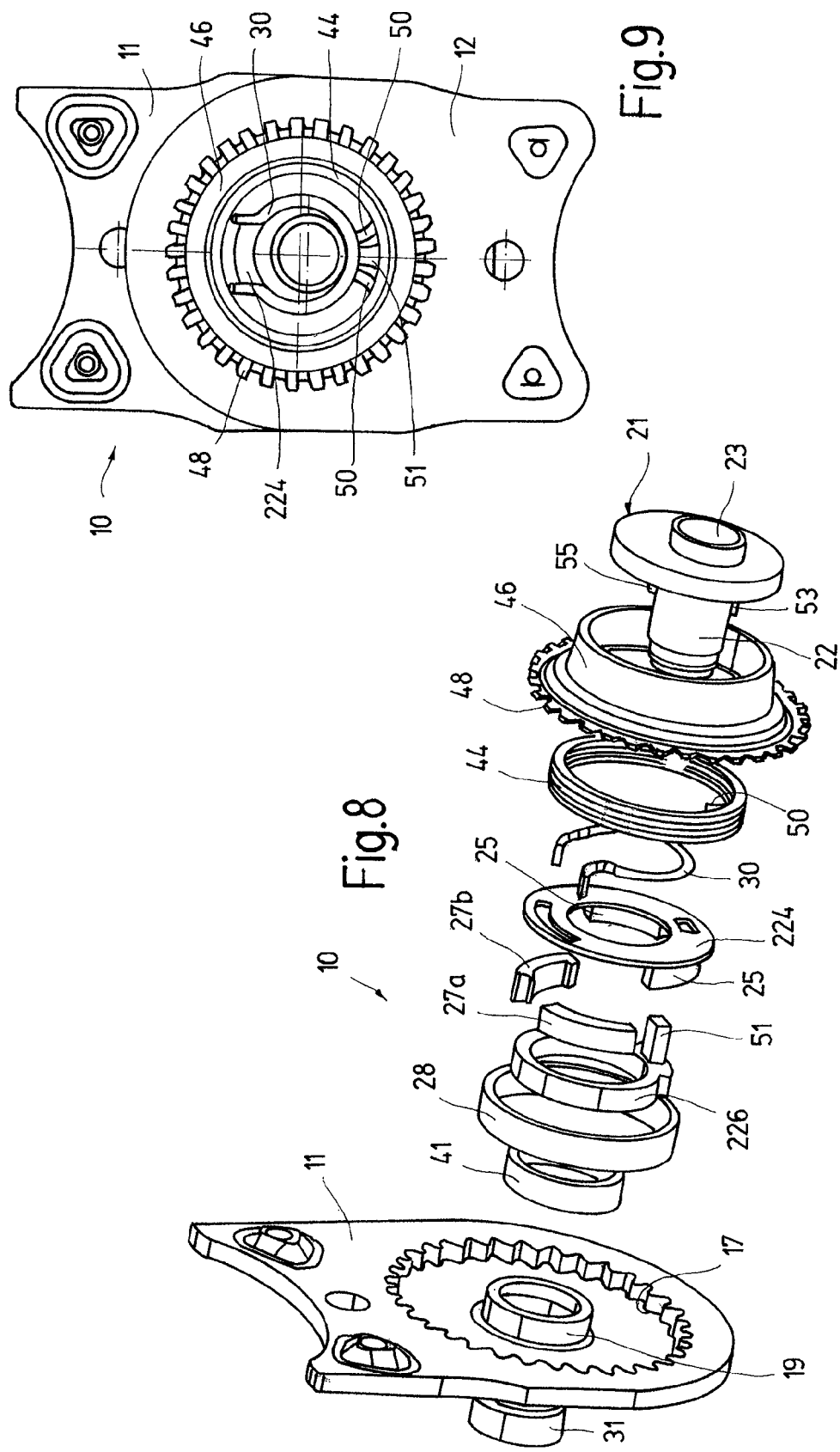

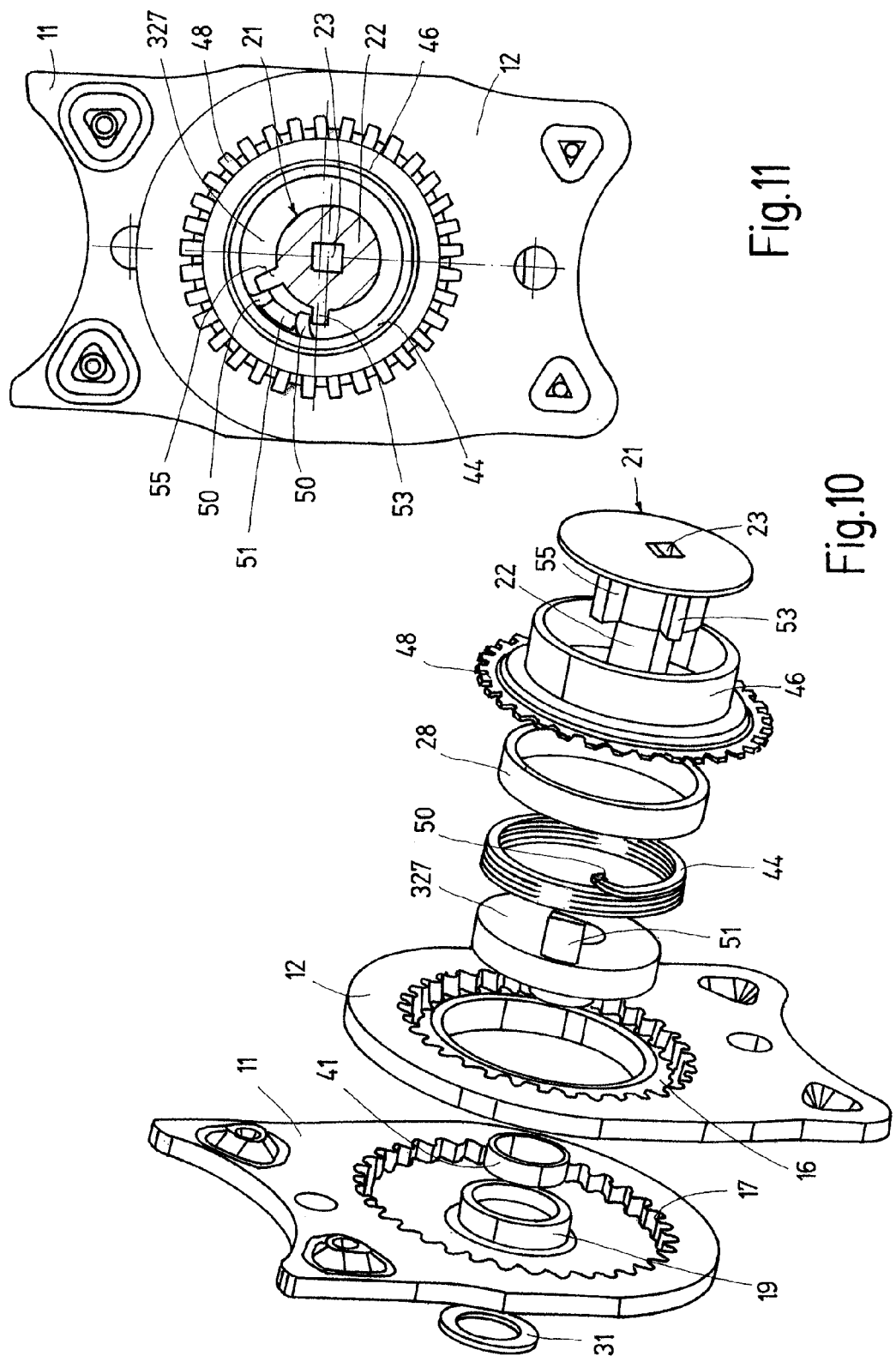

FITTING FOR A VEHICLE SEAT

CROSS-REFERENCE TO RELATED APPLICATION

The present application is a continuation of International Application PCT/EP2006/005255, which was filed Jun. 2, 2006. The entire disclosure of International Application PCT/EP2006/005255, which was filed Jun. 2, 2006, is incorporated herein by reference.

TECHNICAL FIELD

The present invention relates to a fitting for a vehicle seat, in particular for a motor vehicle seat, with the fitting having a first fitting part, a second fitting part in geared connection with the first fitting part, an eccentric rotatably mounted on the fitting parts for driving relative rolling between the first and second fitting parts, a driver for driving the eccentric, and a brake for locking the fitting in the inoperative state against torques introduced on the output side.

BACKGROUND

In the case of a fitting of the above-described type known from DE 103 52 630 A1, a brake is placed on the outside and, in the inoperative position of the fitting, the brake fixes the drive shaft in relation to the first fitting part. Torques which are introduced on the output side of the fitting, for example due to the weight of the backrest, a specific loading of the output side of the fitting or due to vibrations, are therefore blocked. When the fitting is driven, the brake is released, and therefore the fitting parts can execute their rolling movement without hindrance.

SUMMARY OF SOME ASPECTS OF THE INVENTION

The present invention is based on the object of improving a fitting of the type described in the above Technical Field section of this disclosure. This object is achieved according to the invention by a fitting for a vehicle seat, in particular for a motor vehicle seat, with the fitting comprising: a first fitting part and a second fitting part, wherein there is geared connection between the first fitting part and the second fitting part so that there can be relative rolling between the first fitting part and the second fitting part, and an output side of the fitting comprises the first fitting part; an eccentric that is rotatably mounted on the first and second fitting parts, wherein the eccentric is for being driven, and the eccentric is for causing the relative rolling between the first fitting part and the second fitting part in response to the eccentric being driven; a driver for driving the eccentric so that the eccentric causes the relative rolling between the first fitting part and the second fitting part; and at least one wrap spring brake for locking the fitting against torque introduced at the output side of the fitting during an inoperative state of the fitting, whereby the wrap spring brake is for restricting relative rolling between the first fitting part and the second fitting part during the inoperative state of the fitting, wherein the wrap spring brake is at least indirectly acted upon by the driver and/or the eccentric.

Because of the fact that at least one wrap spring brake, which is acted upon by the driver and/or the eccentric, is provided as the brake, it is possible for the brake to be functionally integrated into the fitting, with components of the geared fitting being used in a dual function also to act upon (e.g., activate) the brake. Wrap spring arms are preferably provided for use in acting upon the wrap spring brake. Acting upon the wrap spring brake can take place directly, i.e. by direct bearing of the driver and/or eccentric against the wrap spring arms and subsequently acting upon the wrap spring arms. Alternatively, acting upon the wrap spring brake can take place indirectly, i.e. with the use of intermediate components, such as disks or separate cams (e.g., the wrap spring brake is at least indirectly acted upon). The functional integration is preferably accompanied by structural integration, for example by arrangement of the wrap spring arms in the center of the fitting or the accommodation of a separately designed wrap spring bushing. The wrap spring bushing is provided as a counterpart for the braking action. The wrap spring bushing can be a separately formed part of the fitting. Alternatively, the wrap spring bushing can be integrally formed with a fitting part, for example as a collar extension, step or wider bearing bore of the fitting part. Either the inner side or the outer side of the wrap spring bushing can be the relevant surface for producing the braking action.

A fitting of this type, which is provided on at least one side of the vehicle seat, is safe with regard to running-down as well as favorable with regard to efficiency. "Running-down" is to be understood as meaning that, by way of regular or irregular mechanical excitation (vibration or shaking), the two fitting parts bring about a rotation of the eccentric which leads, under the torque of the weight of the backrest, to a rolling movement of the fitting parts with the backrest pivoting backwards. A brake of the mentioned type does not need to be provided in the fitting on the other side of the vehicle seat, but a brake is preferably provided on both sides of the vehicle seat. The wrap spring brake supplies a high locking moment on the output side, but rotates with a freewheeling moment which is low in relation to the locking moment if a torque is introduced on the drive side.

Since torques on the drive side are introduced via the driver, the driver is preferably designed in such a manner that it acts on the wrap spring brake in an opening manner and releases the wrap spring brake during driving, for example by the driver having at least one driver cam which, upon bearing against a wrap spring arm and subsequently acting upon the wrap spring arm, acts on the wrap spring brake in an opening (e.g., releasing) manner. Alternatively, the driver can have a receptacle—if play is appropriately provided—for a wrap spring arm.

Since the eccentric, on account of its mounting (firstly on the first fitting part and secondly on the second fitting part) is situated in the force flux and, in addition to the toothings between the fitting parts, receives the forces and torques introduced on the output side, including the fluctuations thereof due to mechanical excitation, the eccentric is preferably designed in such a manner that it acts on the wrap spring brake in a closing (e.g., activating) manner such that the wrap spring brake can produce its locking moment and therefore its braking action, for example by the eccentric having a control cam which, upon bearing against a wrap spring arm with subsequent action upon the wrap spring arm, acts on the wrap spring brake in a closing manner. Alternatively, the eccentric can have a receptacle—if play is appropriately provided—for a wrap spring arm. The mounting of the eccentric on a fitting part is to cover all variants of the relative mounting of the eccentric and the fitting part, i.e. the eccentric can be mounted, for example, in (radially within) a collar extension or step of the fitting part or on (radially outside) the collar extension or step of the fitting part.

The wrap spring brake produces its locking moment preferably by bearing against a wrap spring bushing which is rotationally fixed with respect to the second fitting part, preferably by way of a positive fit between suitable projections, for example radially protruding arms, of the wrap spring bushing and an inner toothing (present because of the production process) of the second fitting part. The wrap spring brake is preferably arranged within the wrap spring bushing, and therefore bears against the inner wall thereof, and its wrap spring arms protrude radially inward.

The eccentric is preferably mounted at least partially, for example an individual wedge segment of the eccentric is mounted, with little friction both on the first fitting part and on the second fitting part, in particular by way of a sliding bearing and/or rolling bearing and/or surface processing and/or surface treatment. Since the friction between the sliding bearing (or rolling bearing) and the component sliding relative to the bearing is lower than the direct friction between the wedge segments and the fitting parts, the losses during driving of the fitting, i.e. during the adjustment movement, are reduced, thus increasing the efficiency of the fitting. For the same output power, a lower driving power is therefore necessary. The freedom from play and the strength are maintained.

The lower friction of the sliding bearing in relation to conventional steel is based on special surface processing and/or surface treatment. Such surface processing (for example mechanical) or surface treatment (for example chemical) including the application of a coating can also take place directly on the fitting parts. The lower friction of the rolling bearing in relation to the sliding friction of conventional steel is based on the rolling friction of the rolling bodies. The sliding bearings or rolling bearings etc. can also be provided in a mixed combination.

The eccentric can have two wedge segments which are spread apart and, as a result, position the fitting in the inoperative state in a manner free from play. The wedge segments preferably move in the axially identical plane which is parallel to the planes of movement of the fitting parts. The wedge segments within the context of the invention may also each be formed on a disk, with the two (eccentric) disks then being arranged offset axially with respect to each other. The eccentric may also be in a single part—omitting the configuration in which it is free from play. For example, the eccentric may be designed as a sickle element or disk-shaped fixed eccentric, which simplifies production and installation. The driver may be in a single part or a number of parts.

Since the backrest is loaded more to the rear than to the front, one wedge segment is subjected to a higher load, and therefore basically a higher degree of friction occurs thereon. The wedge segment which is subjected to a higher load is preferably therefore the wedge segment mounted on both sides by way of sliding bearings. However, the other wedge segment or—likewise preferably—both wedge segments may also be mounted on both sides by way of sliding bearings.

It is possible for a wrap spring brake to be provided for each of the two directions of rotation of the driver. As a result, the wedge segment which is subjected to the stronger load (running wedge) is immediately and directly locked in both directions during a running-down movement without first a deviation due to an idling path which is present until it bears against the associated wrap spring arm taking place. The wedge segment which is subjected to less load (locking wedge) then takes on the position which is free from play in the inoperative state of the fitting.

The fitting according to the invention can be operated both manually and also by a motor, and can be used in vehicle seats, preferably for an angle-adjustable seat component, in particular a seat part or backrest, for adjusting an angle within the seat component, for example the inclination of the seat cushion relative to a base, the inclination of a thigh support relative to the seat frame or the inclination of rockers, which serve to adjust the seat height, with respect to the seat frame or with respect to a base, or for adjusting an angle relative to another seat component, for example the inclination of the backrest relative to the seat part.

BRIEF DESCRIPTION OF THE DRAWINGS

The invention is explained in more detail below with reference to five exemplary embodiments with modifications, illustrated in the drawings.

FIG. 1 shows an exploded illustration of the first exemplary embodiment.

FIG. 2 shows a partial view of the first exemplary embodiment with the driver only partially shown.

FIG. 5 shows an exploded illustration of the second exemplary embodiment.

FIG. 6 shows a partial view of the second exemplary embodiment without a driver.

FIG. 7 shows an exploded illustration of the third exemplary embodiment.

FIG. 8 shows an exploded illustration of the fourth exemplary embodiment without the second fitting part.

FIG. 9 shows a view of the fourth exemplary embodiment without a driver.

FIG. 10 shows an exploded illustration of the fifth exemplary embodiment.

FIG. 11 shows a view of the fifth exemplary embodiment with the driver only partially shown.

FIG. 12 shows a schematic diagram of the modification with two wrap spring brakes.

FIG. 13 shows a perspective partial view of the modification with two wrap spring brakes.

DETAILED DESCRIPTION OF EXEMPLARY EMBODIMENTS

Figure 3:
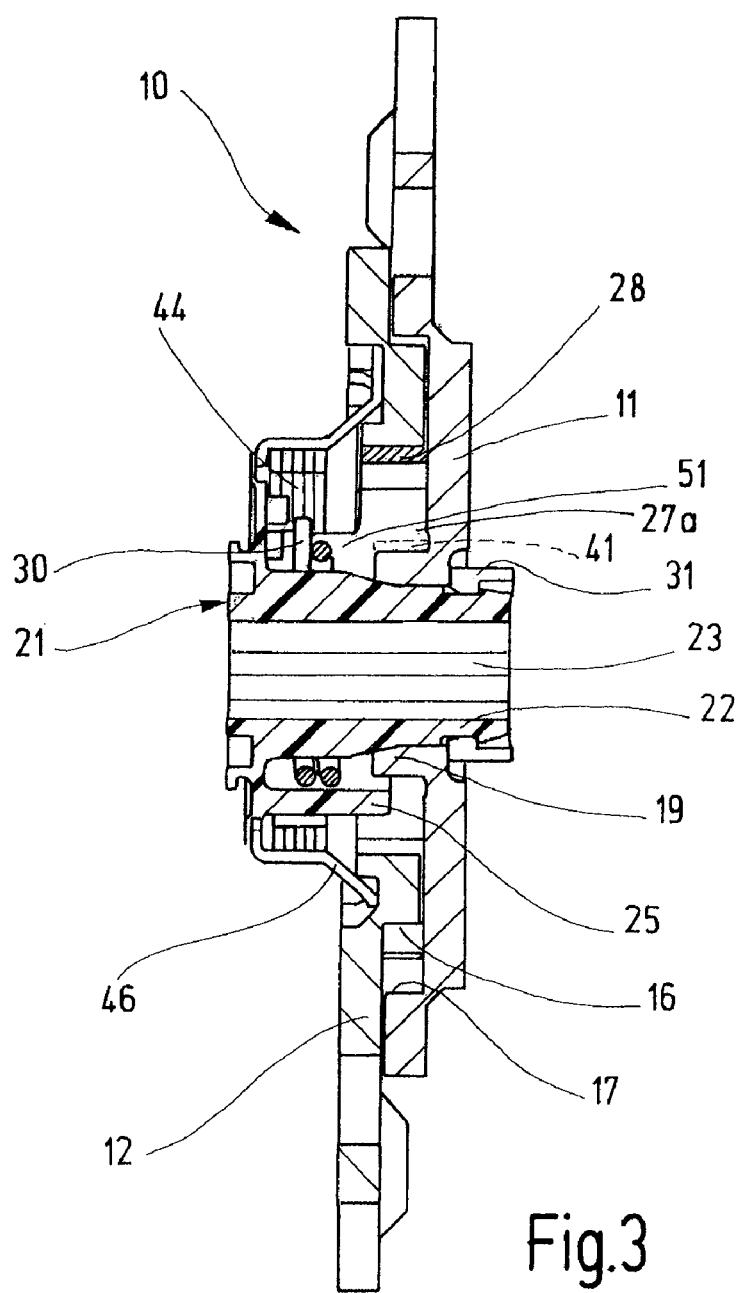
FIG. 3 shows a longitudinal section of a fitting according to the invention.
Figure 4:
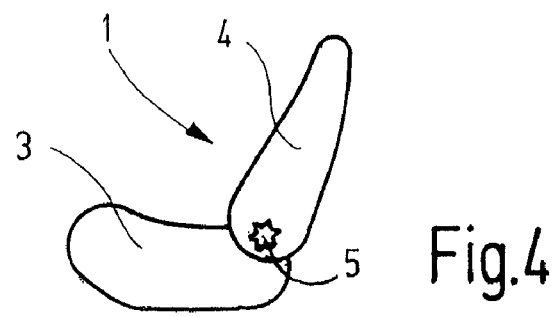
FIG. 4 shows a schematic illustration of a vehicle seat.

A vehicle seat 1 for a motor vehicle has a seat part 3 and a backrest 4. The backrest 4 can be adjusted in its inclination relative to the seat part 3. The hand wheel 5 is located on one side of the vehicle seat 1 and rotates a drive shaft (not shown). The drive shaft is arranged horizontally in the transition region between seat part 3 and backrest 4 and, on both sides of the vehicle seat 1, engages in a rotationally fixed manner in a respective fitting 10. The backrest 4 is connected to the seat part 3 by way of the two fittings 10.

The fitting 10 is designed as a geared fitting, in which a first fitting part 11 and a second fitting part 12 are connected to each other for adjustment and fixing via a gear designed as an eccentric epicyclic gear which is self-locking at least in the case of one of the two fittings 10 of the vehicle seat 1. The two fitting parts 11 and 12 have an essentially (e.g., substantially) flat shape and are composed of steel. The first fitting part 11 is fixedly connected to the structure supporting the hand wheel 5 and the drive shaft (in the present case, first fitting part 11 is fixedly connected to the structure of the backrest 4). Therefore, in the exemplary embodiment, the first fitting part 11 is illustrated in a manner for being fixed on the backrest (e.g., the first fitting part 11 is shown extending above the second fitting part 12 in the drawings). Accordingly, in the exemplary embodiment, the second fitting part 12 is fixed on the seat part, i.e. the second fitting part 12 is connected to the structure of the seat part 3, and the second fitting part 12 is shown extending below the first fitting part 11 in the drawings. The positions of the fitting parts 11 and 12 may be interchanged, depending on requirements, i.e. the direction of the force flux through the fitting 10 may be the opposite way around to the previously mentioned arrangement of the fitting parts 11 and 12. The terms "mounting" and "supporting" used below are therefore not intended to be limiting with regard to the direction of the force flux.

In order to form the gear, a toothed wheel 16 with an outer toothing is embossed on the second fitting part 12, a toothed ring 17 with an inner toothing is embossed on the first fitting part 11, and teeth of the toothed wheel 16 and the toothed ring 17 mesh with each other. The diameter of the outside circle of the outer toothing of the toothed wheel 16 is smaller by at least one tooth height than the diameter of the root circle of the inner toothing of the toothed ring 17. The corresponding difference in the number of teeth of toothed wheel 16 and toothed ring 17 permits a rolling movement of the toothed ring 17 on the toothed wheel 16. The first fitting part 11 has, on its side which faces the toothed wheel 16, an integrally formed collar extension 19. The collar extension 19 is concentric with respect to the inner toothing of the toothed ring 17.

To the extent thus far in this Detailed Description section, all of the exemplary embodiments are the same. The first and the second exemplary embodiments are first of all described together below.

A driver 21 is mounted with play by way of a hub 22 in the collar extension 19. The driver 21, which is composed of plastic and the arrangement of which defines the direction details used in this disclosure, is provided centrally with a bore 23 which matches the external splines of the drive shaft and runs axially. Furthermore, the driver 21 has an integrally formed driver segment 25 which is arranged in a curved manner about (e.g., around) part of the collar extension 19. Two wedge segments 27a and 27b are supported, at least indirectly by way of their curved inner sides, on the collar extension 19. The wedge segments 27a and 27b, by way of their curved outer sides, support a first sliding bearing 28. The first sliding bearing 28 is pressed into the second fitting part 12 in a rotationally fixed manner. The friction between the outer side of the metallic wedge segments 27a and 27b and the inner side of the bushing-shaped, first sliding bearing 28 is significantly lower than the direct friction between the wedge segments 27a and 27b and the fitting parts 11 or 12 would be.

The driver segment 25 engages with play between the narrow ends of the wedge segments 27a and 27b. The mutually facing wide ends of the wedge segments 27a and 27b each support an angled end finger of an annularly coiled spring. This annularly coiled spring is referred to below as omega spring 30. The omega spring 30 pushes the wedge segments 27a and 27b apart in the circumferential direction and therefore configures the fitting 10 in a manner free from play in the inoperative state. The driver 21 is secured axially on the outer side of the first fitting part 11 by way of a securing ring 31 which is clipped on. In order to absorb the axially acting forces, holding plates (not shown in the drawings) are respectively welded (in a manner known per se) onto the two fitting parts 11 and 12 and respectively engage over the other fitting part in each case without obstructing the adjustment movement.

The wedge segments 27a and 27b define an eccentric which is located in the force flux between the fitting parts 11 and 12 and is mounted on the fitting parts 11, 12. The driver segment 25, which can also be classed as part of the eccentric, is located outside the force flux. The eccentric, as an extension of the direction of eccentricity, presses the toothed wheel 16 and the toothed ring 17 into each other at an engagement point defined by the eccentricity. During driving by way of the rotating drive shaft, a torque is first transmitted to the driver 21 and then to the eccentric (e.g., the wedge segments 27a, 27b) which slides along the first sliding bearing 28, shifting the direction of eccentricity and therefore shifting the engagement point of the toothed wheel 16 in the toothed ring 17. The shifting of the engagement point of the toothed wheel 16 in the toothed ring 17 manifests itself as a wobbling rolling movement of the fitting parts 11 and 12 on each other.

Because of the weight of the backrest 4, which is customarily situated obliquely, and a pressure exerted on the backrest 4 by the occupant, a differentiation can be made in the case of the wedge segments 27a and 27b between a first wedge segment 27a, which is subjected to a higher load and is in front during an upward movement of the backrest 4, and a second wedge segment 27b which is subjected to a lower load. The efficiency of the fitting 10 depends noticeably on the friction between the first wedge segment 27a and the collar extension 19. According to the invention, in order to reduce this friction, a second sliding bearing 41 is provided which sits in a more or less (e.g., substantially) immovable manner (adhering) on the first wedge segment 27a and slides with little friction on the collar extension 19, i.e. the second sliding bearing 41 corresponds functionally to the first sliding bearing 28.

In the first exemplary embodiment, the second sliding bearing 41 is designed as a ring segment which extends over somewhat less than the inner side of the first wedge segment 27a. In the second exemplary embodiment, the second sliding bearing 41 is designed as a ring which is more or less (e.g., substantially) completely closed and on which the wedge segment 27b which is subjected to a lower load also sits. Since the two exemplary embodiments otherwise correspond, except for geometrical adaptations to the shape of the second sliding bearing 41, components which are identical and act in an identical manner bear the same reference numbers. In a modification to both exemplary embodiments, the second sliding bearing 41 is positioned on the inner side of the collar extension 19 in a region free from the hub 22, and the first wedge segment 27a, which is subjected to a greater load, is mounted to the second sliding bearing by way of an extension arm.

The friction between the first wedge segment 27a and the collar extension 19 not only has an effect on the efficiency but also on the self-locking of the gear of the fitting 10. So that at least one of the two fittings 10 of the vehicle seat 1 remain self-locking in spite of the first wedge segment 27a being mounted in a sliding manner on two sides and, in the inoperative state, is locked against torques introduced on the output side, according to the invention, in the case of this fitting 10, a brake which is effective in the inoperative state of the fitting 10 is provided, namely a wrap spring brake 44. The wrap spring brake 44 is arranged in a wrap spring bushing 46 and, on account of its prestress, the wrap spring brake 44 bears frictionally against the inner wall of the wrap spring bushing 46. The wrap spring bushing 46, which is produced, for example, from an aluminum alloy or from plastic, is arranged in a rotationally fixed manner on the second fitting part 12 by three groups of three radially (and/or axially) protruding wrap spring bushing arms 48 which are offset with respect to one another by 120°. The wrap spring bushing arms 48 engage with a positive fit in the inner toothing produced on the rear side of the toothed wheel 16 by the embossing operation.

For being acted upon, the wrap spring brake 44 has a radially inwardly protruding wrap spring arm 50 at each of its ends. The first wedge segment 27a is provided with an axially protruding control cam (e.g., brake cam 51) which is arranged between the two wrap spring arms 50 with play in the circumferential direction. "Between" or "within" is to be understood in each case as meaning an arrangement which relates to the smaller of the two possible angular ranges in the circumferential direction while "outside" relates to the larger of the two possible angular ranges in the circumferential direction. When the brake cam 51 bears against a wrap spring arm 50 with sufficient force, the brake cam 51 acts on the wrap spring brake 44 in a closing manner (activating manner), i.e. brakes the wrap spring brake 44 (because of an increasing outside diameter of the wrap spring brake 44 and increased friction on the wrap spring bushing 46) and prevents rotation of the components defining the eccentric relative to the second fitting part 12. With blockage of the eccentric, the first fitting part 11 is also fixed relative to the second fitting part 12.

In order to cancel the braking action of the wrap spring brake 44 during driving of the driver 21, first, at the end of the driver segment 25 which is assigned to the first wedge segment 27a, a first driver cam 53 is provided on the driver 21; and second, a second driver cam 55 is provided in the region which is arranged at approximately identical radial spacing between the ends of the driver segment 25. The first and second driver cams 53, 55 both protruding axially. The wrap spring arms 50 together with the control cam (e.g., brake cam 51) are arranged with play between the two driver cams 53 and 55 (within the context of the above definition), i.e. the driver cams 53 and 55 are arranged in the circumferential direction outside the wrap spring arms 50. When the driver 21 is rotated, first of all one of the driver cams 53 or 55 comes to bear against a wrap spring arm 50, which acts in an opening manner (releasing manner) on the wrap spring brake 44 (because of a slight reduction in the outside diameter of the wrap spring brake 44 with reduced friction at the wrap spring bushing 46) and cancels the braking action. As the movement continues, the eccentric drives the above-described rolling movement of the fitting parts 11 and 12 on each other.

The third exemplary embodiment according to FIG. 7 is identical to the previous exemplary embodiments, in particular to the second exemplary embodiment, unless described differently below, for which reason components which are identical or are essentially identical bear the same reference numbers.

The driver 21, which is not changed in design, is mounted in the collar extension 19 of the first fitting part 11 while a sickle segment 127 is supported on the collar extension 19 (i.e. on the outer side of the collar extension 19). The sickle segment 127 is arranged in a sickle-shaped manner about a part of the collar extension 19. The sickle segment 127, by way of its curved outer side, supports the first sliding bearing 28, which is pressed into the second fitting part 12 in a rotationally fixed manner. In terms of its shape and function, the sickle segment 127 corresponds to an integral combination of the two wedge segments 27a and 27b. The driver segment 25 engages with play between the narrow ends of the sickle segment 127. The securing ring 31 and the holding plates (not shown in the drawings) correspond to the previous exemplary embodiments.

The sickle segment 127 defines an eccentric which is located in the force flux between the fitting parts 11 and 12 and is mounted thereon. In an extension of the direction of eccentricity, the eccentric presses the toothed wheel 16 and the toothed ring 17 into each other at an engagement point defined by the eccentricity. During driving by way of the rotating drive shaft, a torque is first of all transmitted to the driver 21 and then to the eccentric (e.g., sickle segment 127) which slides along the first sliding bearing 28 shifting the direction of eccentricity and therefore shifting the engagement point of the toothed wheel 16 in the toothed ring 17. The shifting the engagement point of the toothed wheel 16 in the toothed ring 17 manifests itself as a wobbling rolling movement of the fitting parts 11 and 12 on each other.

Analogously to the previous exemplary embodiments, the efficiency of the fitting 10 depends noticeably on the friction between the sickle segment 127 and the collar extension 19. As in the second exemplary embodiment, the second sliding bearing 41, which is designed as a more or less (e.g., substantially) completely closed ring, is provided to reduce this friction. The second sliding bearing 41 is either mounted immovably on the collar extension 19, for example is pressed in a slotted embodiment or is adhering in a closed embodiment, and allows the sickle segment 127 to slide along with little friction, or the second sliding bearing 41 sits more or less (e.g., substantially) immovably (adhering) on the sickle segment 127 and slides with little friction along the collar extension 19, i.e. corresponds in each case functionally to the first sliding bearing 28.

The wrap spring brake 44 is again provided, so that, in the inoperative state, the fitting 10 remains self-locking and is locked against torques introduced on the output side. The wrap spring bushing 46 receives the wrap spring brake 44 and holds it frictionally. The wrap spring bushing 46 has wrap spring bushing arms 48 protruding radially all around, which can also be used in the two previous exemplary embodiments. The wrap spring bushing arms 48 engage with a positive fit in the inner toothing produced on the rear side of the toothed wheel 16 by the embossing operation.

For being acted upon, the wrap spring brake 44 again has the two wrap spring arms 50 while the sickle segment 127 is provided with the axially protruding control cam 51 which is arranged between the two wrap spring arms 50. The above-mentioned definition for "between", "within" and "outside" applies. When the brake cam 51 bears against a wrap spring arm 50 with sufficient force, the brake cam 51 acts on the wrap spring brake 44 in a closing manner. In order to cancel the braking action of the wrap spring brake 44 during driving of the driver 21, a first driver cam 53 and a second driver cam 55 are again provided on the driver 21 and receive the wrap spring arms 50 between them. When the driver 21 is rotated, first of all one of the driver cams 53 or 55 comes to bear against a wrap spring arm 50, which acts in an opening manner (releasing) on the wrap spring brake 44 and cancels the braking action. During continued movement, the eccentric drives the above-described rolling movements of the fitting parts 11 and 12 on each other.

The fourth exemplary embodiment according to FIGS. 8 and 9 is similar to the previous exemplary embodiments, in particular the second exemplary embodiment, unless described differently below, for which reason components which are identical or are essentially identical bear the same reference numbers.

The driver 21 firstly comprises a hub 22 for mounting with play in the collar extension 19 of the first fitting part 11 and for receiving the drive shaft in a central bore 23. The hub 22 has a covering disk that is located at the end of the hub 22 and faces outward. Secondly, the driver 21 comprises a separately formed, perforated driver disk 224. The driver disk 224 is connected in a rotationally fixed manner to the hub 22 and has two integrally formed driver segments 25 which are arranged in a semicircular manner around part of the collar extension 19. There is a gap between the driver segments 25. An eccentric ring 226 is supported on the collar extension 19 and the two wedge segments 27a and 27b are supported in turn, by way of their curved inner side, on said eccentric ring and, by way of their curved outer sides, support a first sliding bearing 28 which is pressed into the second fitting part 12 in a rotationally fixed manner. The friction conditions are as in the previous exemplary embodiments.

The two driver segments 25 grasp with play between the narrow sides of the wedge segments 27a and 27b while the mutually facing wide sides of the wedge segments 27a and 27b each support an angled end finger of an omega spring 30, the omega spring 30 being arranged on the other side of the driver disk 224 and the end fingers reaching through a slotted guide of the driver disk 224. The omega spring 30 pushes the wedge segments 27a and 27b apart in the circumferential direction and therefore positions the fitting 10 in the inoperative state in a manner free from play. The securing ring 31 and the holding plates (not illustrated in the drawing) correspond to the previous exemplary embodiments.

The wedge segments 27a and 27b and the eccentric ring 226 define an eccentric which is located in the force flux between the fitting parts 11 and 12 and is mounted on the second fitting part 12. As an extension of the direction of eccentricity, the eccentric pushes the toothed wheel 16 and the toothed ring 17 into each other at an engagement point defined in this manner. During driving by way of the rotating drive shaft, a torque is first of all transmitted to the driver 21 and then to the eccentric (e.g., wedge segments 27a and 27b) which slides along the first sliding bearing 28 shifting the direction of eccentricity and therefore shifting the engagement point of the toothed wheel 16 in the toothed ring 17, which is depicted as a wobbling rolling movement of the fitting parts 11 and 12 on each other.

Analogously, to the previous exemplary embodiments, the efficiency of the fitting 10 depends noticeably on the friction between the eccentric ring 226 and the collar extension 19. As in the second exemplary embodiment, the second sliding bearing 41, which is designed as a more or less (e.g., substantially) completely closed ring, is provided to reduce this friction. The second sliding bearing 41 is either pressed onto the collar extension 19 and allows the eccentric ring 226 to slide along with little friction, or the second sliding bearing 41 sits more or less (e.g., substantially) immovably on the eccentric ring 226 and slides with little friction on the collar extension 19, i.e. corresponds in each case functionally to the first sliding bearing 28.

So that the fitting 10 remains self-locking in the inoperative state and is blocked against torques introduced on the output side, the wrap spring brake 44 is again provided. The wrap spring bushing 46 which receives it and holds it frictionally has wrap spring bushing arms 48 protruding radially all the way around. The wrap spring bushing arms 48 engage with a positive fit in the inner toothing produced on the rear side of the toothed wheel 16 by the embossing operation.

For being acted upon, the wrap spring brake 44 again has the two wrap spring arms 50 while the eccentric ring 226 is provided with the axially protruding control cam 51 which reaches through an opening in the driver disk 224 and is arranged in the circumferential direction between the two wrap spring arms 50. The abovementioned definition for "between", "within" and "outside" applies. When the brake cam 51 bears against a wrap spring arm 50 with sufficient force, the brake cam 51 acts on the wrap spring brake 44 in a closing manner. In order to cancel the braking action of the wrap spring brake 44 during driving of the driver 21, a first driver cam 53 and a second driver cam 55 are again provided on the hub 22, and the wrap spring arms 50 are held between the first and second driver cams 53, 55. When the driver 21 is rotated, one of the driver cams 53 or 55 first of all comes to bear against a wrap spring arm 50, which acts in an opening manner (releasing) on the wrap spring brake 44 and cancels the braking action. During the further movement, the eccentric drives the above-described rolling movement of the fitting parts 11 and 12 on each other.

The fifth exemplary embodiment according to FIGS. 10 and 11 is similar to the previous exemplary embodiments, in particular the third exemplary embodiment, unless described differently below, for which reason parts which are identical or are essentially identical bear the same reference numbers.

A solid eccentric 327 has a body which is in the shape of a cylindrical disk. The outer side of the solid eccentric 327 supports the first sliding bearing 28, which is pressed into the second fitting part 12 in a rotationally fixed manner. The solid eccentric 327 has a hub that is formed integrally with the cylindrical body of the solid eccentric 327. The hub of the solid eccentric 327 is arranged eccentrically with respect to the center of the cylindrical body of the solid eccentric 327. The hub of the solid eccentric 327 is mounted in the collar extension 19 of the first fitting part 11 by way of the second sliding bearing 41. The second sliding bearing 41 is pressed, for example, into the collar extension 19 and allows the solid eccentric 327 to slide along with little friction (and is designed in this case as a closed ring) or sits more or less (e.g., substantially) immovably on the solid eccentric 327 and slides with little friction in the collar extension 19 (and is designed in this case as a more or less (e.g., substantially) completely closed ring). The second sliding bearing 41 corresponds in each case functionally to the first sliding bearing 28 and, because of the reduced friction, influences the efficiency of the fitting 10 analogously to the previous exemplary embodiment.

The driver 21 is mounted rotatably by way of its hub 22 within the hollow hub of the solid eccentric 327. The driver 21 is coupled to the solid eccentric 327 for carrying the solid eccentric 327 along and so that there is an idling path, i.e. the driver 21 carries along the solid eccentric 327 in the circumferential direction after passing through the idling path. The securing ring 31 and the holding plates (not shown in the drawings) correspond to the previous exemplary embodiments.

The solid eccentric 327 forms an eccentric which is located in the force flux between the fitting parts 11 and 12 and is mounted on second fitting part 12. As an extension of the direction of eccentricity, the eccentric pushes the toothed wheel 16 and the toothed ring 17 into each other at an engagement point defined by the eccentricity. During driving by way of the rotating drive shaft, a torque is first of all transmitted to the driver 21 and then to the eccentric (e.g., the solid eccentric 327) which slides along the first sliding bearing 28 shifting the direction of the eccentricity and therefore shifting the engagement point of the toothed wheel 16 in the toothed ring 17. The shifting of the engagement point of the toothed wheel 16 in the toothed ring 17 manifests itself as a wobbling rolling movement of the fitting parts 11 and 12 on each other.

So that the fitting 10 remains self-locking in the inoperative state and is blocked against torques introduced on the output side, a wrap spring brake 44 is again provided. The wrap spring bushing 46, which receives the wrap spring brake 44 and holds the wrap spring brake 44 frictionally, has wrap spring bushing arms 48 protruding radially all the way around. The wrap spring bushing arms 48 engage with a positive fit in the inner toothing produced on the rear side of the toothed wheel 16 by the embossing operation.

For being acted upon, the wrap spring brake 44 again has the two wrap spring arms 50 and the solid eccentric 327 is provided with the axially protruding control cam 51, which is arranged between the two wrap spring arms 50. The abovementioned definition for "between", "within" and "outside" applies. When the brake cam 51 bears against a wrap spring arm 50 with sufficient force, the brake cam 51 acts on the wrap spring brake 44 in a closing manner. In order to cancel the braking action of the wrap spring brake 44 during driving of the driver 21, a first driver cam 53 and a second driver cam 55 are again provided on the driver 21, and the wrap spring arms 50 are held between the first and second driver cams 53, 55. When the driver 21 is rotated, first of all one of the driver cams 53 or 55 comes to bear against a wrap spring arm 50, which acts in an opening manner (releasing) on the wrap spring brake 44 and cancels the braking action. During further movement, the eccentric drives the above-described rolling movement of the fitting parts 11 and 12 on each other.

For all of the exemplary embodiments, a modification is possible, according to which one wrap spring brake 44 is provided per direction of rotation, with the wrap spring brakes closing in opposite directions. A wrap spring arm 50 of each wrap spring brake 44 is then fitted or attached in some other way, preferably in a manner free from play, on the first wedge segment 27a, sickle segment 127, solid eccentric 327 or the respective control cam 51, whereas the two other wrap spring arms 50 are acted upon by a respective driver cam 53 or 55 (after passing through a small idling path), which is illustrated schematically in FIG. 12. During driving of the driver 21, one of the two wrap spring brakes 44 is opened (released) by the driver cam 53 or 55 and the other by the first wedge segment 27a etc. The two wrap spring brakes 44 are preferably arranged axially next to each other in the same wrap spring bushing 46, as illustrated in FIG. 13.

For all of the exemplary embodiments, a further modification is possible. In accordance with this further modification, the wrap spring bushing is formed integrally with the second fitting part 12 by the material region, which forms the bearing opening for receiving the first sliding bearing 28, being somewhat extended axially in the manner of a collar extension. The outer end of this axially extended collar extension, which is an integral part of the second fitting part 12, (i.e., the axially extended collar extension's rear end that faces away from the axially extended collar extension's end that supports the first sliding bearing 28) holds the wrap spring brake 44.

With the arrangement of the wrap spring brake 44 on the outer side of the wrap spring bushing, the manner of operation of the wrap spring brake 44 is reversed, i.e. an increase of the diameter acts in an opening (releasing) manner while a contraction with reduction of the diameter acts in a closing (braking) manner. Accordingly, two radially outwardly protruding control cams 51 are provided on the first wedge segment 27a, sickle segment 127 or solid eccentric 327 and hold the wrap spring arms 50 between them (within the meaning of the abovementioned definition for "between", "within" and "outside") and the driver cam 53 is then arranged between said wrap spring arms 50. In the case of two wedge segments 27a and 27b, the already mentioned mounting of the first wedge segment 27a is by way of an extension arm in the collar extension 19 (on its inner side) and of the second wedge segment 27b on the collar extension 19 (on its outer side).

It will be understood by those skilled in the art that while the present invention has been discussed above with reference to an exemplary embodiments, various additions, modifications and changes can be made thereto without departing from the spirit and scope of the invention as set forth in the following claims.

That which is claimed:

1. A fitting for a vehicle seat, the fitting comprising:
   a first fitting part and a second fitting part, wherein there is geared connection between the first fitting part and the second fitting part so that there can be relative rolling between the first fitting part and the second fitting part, and an output side of the fitting comprises the first fitting part;
   an eccentric that is rotatably mounted on the first and second fitting parts, wherein the eccentric is for being driven, and the eccentric is for causing the relative rolling between the first fitting part and the second fitting part in response to the eccentric being driven;
   a driver for driving the eccentric so that the eccentric causes the relative rolling between the first fitting part and the second fitting part, wherein the driver is mounted for being rotated in opposite first and second directions;
   a first wrap spring brake including a first wrap spring arm and a second wrap spring arm, wherein the fitting is configured so that
      the eccentric acts upon the first arm of the first wrap spring brake to activate the first wrap spring brake in response to a first torque being introduced at the output side of the fitting during an inoperative state of the fitting, so that the first wrap spring brake locks the fitting against the first torque to thereby restrict relative rolling between the first fitting part and the second fitting part during the inoperative state of the fitting, and
      the driver acts upon the second arm of the first wrap spring brake to release the first wrap spring brake in response to the driver being rotated in the first direction for driving the eccentric;
   a second wrap spring brake including a first wrap spring arm and a second wrap spring arm, wherein the fitting is configured so that
      the eccentric acts upon the first arm of the second wrap spring brake to activate the second wrap spring brake in response to a second torque, which is directed oppositely to the first torque, being introduced at the output side of the fitting during the inoperative state of the fitting, so that the second wrap spring brake locks the fitting against the second torque to thereby restrict relative rolling between the first fitting part and the second fitting part during the inoperative state of the fitting, and
      the driver acts upon the second arm of the second wrap spring brake to release the second wrap spring brake in response to the driver being rotated in the second direction for driving the eccentric; and
   a bushing that remains stationary with respect to the second fitting part, wherein
      the first wrap spring brake bears against the bushing,
      the bushing has a plurality of radially protruding arms,
      the arms of the bushing engage with a positive fit in an inner toothing of the second fitting part, and
      the inner toothing partially defines the geared connection between the first fitting part and the second fitting part.

2. The fitting according to claim 1, wherein:
   the second fitting part includes a collar extension; and
   the collar extension supports the eccentric.

3. The fitting according to claim 2, wherein the second wrap spring brake bears against the bushing which remains stationary with respect to the second fitting part.

4. The fitting according to in claim 1, wherein the first wrap spring brake is structurally integrated into the fitting.

5. The fitting according to claim 4, wherein the second wrap spring brake is structurally integrated into the fitting.

6. The fitting according to claim 1, comprising:
means for reducing friction between the eccentric and the first fitting part; and
means for reducing friction between the eccentric and the second fitting part.

7. The fitting according to claim 1, wherein the eccentric:
is defined by at least two wedge segments,
is defined by a sickle segment, or
is a solid eccentric.

8. The fitting according to claim 1 in combination with an adjustable seat component of the vehicle seat, wherein the fitting is adapted for angularly adjusting the adjustable seat component.

9. The combination of claim 8 further in combination with the vehicle seat, wherein:
the vehicle seat includes a seat part and a backrest;
the backrest is the adjustable seat component; and
the fitting is adapted for adjusting the backrest's inclination with respect to the seat part.

10. The fitting according to claim 1, wherein:
the eccentric comprises wedge segments; and
a third spring forces the wedge segments apart in a circumferential direction.

11. The fitting according to claim 1, wherein:
the first wrap spring brake is positioned in the bushing and bears against an inner surface of the bushing; and
the bushing is formed separately from second fitting part and is rotationally fixedly connected to the second fitting part, so that the bushing remains stationary with respect to the second fitting part.

12. The fitting according to claim 11, wherein the second wrap spring brake is positioned in the bushing and bears against the inner surface of the bushing.

13. The fitting according to claim 1, wherein:
the eccentric includes an axially projecting control cam that rotates with the eccentric;
the control cam of the eccentric acts upon the first arm of the first wrap spring brake to activate the first wrap spring brake in response to the first torque being introduced at the output side of the fitting during the inoperative state of the fitting; and
the control cam of the eccentric acts upon the first arm of the second wrap spring brake to activate the second wrap spring brake in response to the second torque, which is directed oppositely to the first torque, being introduced at the output side of the fitting during the inoperative state of the fitting.

14. The fitting according to claim 13, wherein:
the eccentric comprises wedge segments;
a third spring forces the wedge segments apart in a circumferential direction;
the third spring includes two arms; and
the two arms of the third spring are respectively engaged to the wedge segments.

15. The fitting according to claim 13, wherein the second wrap spring brake bears against the bushing which remains stationary with respect to the second fitting part.

16. The fitting according to claim 1, wherein:
the driver includes axially projecting first and second driver cams that rotate with the driver;
the first driver cam of the driver acts upon the second arm of the first wrap spring brake to release the first wrap spring brake, and thereby unlock the fitting, in response to the driver being rotated in the first direction for driving the eccentric; and
the second driver cam of the driver acts upon the second arm of the second wrap spring brake to release the second wrap spring brake, and thereby unlock the fitting, in response to the driver being rotated in the second direction for driving the eccentric.

17. The fitting according to claim 1, wherein the second wrap spring brake bears against the bushing which remains stationary with respect to the second fitting part.

18. A fitting for a vehicle seat, the fitting comprising:
a first fitting part and a second fitting part, wherein
there is geared connection between the first fitting part and the second fitting part so that there can be relative rolling between the first fitting part and the second fitting part,
an output side of the fitting comprises the first fitting part, and
the second fitting part includes an inner toothing that partially defines the geared connection between the first fitting part and the second fitting part;
an eccentric that is rotatably mounted on the first and second fitting parts, wherein
the eccentric is for being driven,
the eccentric is for causing the relative rolling between the first fitting part and the second fitting part in response to the eccentric being driven, and
the eccentric includes an axially projecting control cam that rotates with the eccentric;
a driver for driving the eccentric so that the eccentric causes the relative rolling between the first fitting part and the second fitting part, wherein
the driver is mounted for being rotated in opposite first and second directions, and
the driver includes axially projecting first and second driver cams that rotate with the driver;
a bushing having a plurality of radially protruding arms that engage in the inner toothing of the second fitting part so that the bushing remains stationary with respect to the second fitting part;
a first wrap spring brake positioned in and engaging the bushing, wherein the first wrap spring brake includes a first wrap spring arm and a second wrap spring arm, and the fitting is configured so that
the control cam of the eccentric acts upon the first arm of the first wrap spring brake to activate the first wrap spring brake in response to a first torque being introduced at the output side of the fitting during an inoperative state of the fitting, so that the first wrap spring brake locks the fitting against the first torque to thereby restrict relative rolling between the first fitting part and the second fitting part during the inoperative state of the fitting, and
the first driver cam of the driver acts upon the second arm of the first wrap spring brake to release the first wrap spring brake, and thereby unlock the fitting so as to allow relative rolling between the first fitting part and the second fitting part, in response to the driver being rotated in the first direction for driving the eccentric;
a second wrap spring brake positioned in and engaging the bushing, wherein the second wrap spring brake includes a first wrap spring arm and a second wrap spring arm, and the fitting is configured so that
the control cam of the eccentric acts upon the first arm of the second wrap spring brake to activate the second wrap spring brake in response to a second torque, which is directed oppositely to the first torque, being introduced at the output side of the fitting during the inoperative state of the fitting, so that the second wrap spring brake locks the fitting against the second torque to thereby restrict relative rolling between the first fitting part and the second fitting part during the inoperative state of the fitting, and the second driver cam of the driver acts upon the second arm of the second wrap spring brake to release the second wrap spring brake, and thereby unlock the fitting so as to allow relative rolling between the first fitting part and the second fitting part, in response to the driver being rotated in the second direction for driving the eccentric.

* * * * *